United States Patent [19]

Häfner

[11] Patent Number: 5,184,892
[45] Date of Patent: Feb. 9, 1993

[54] SYSTEM AND METHOD FOR CONTINUOUS GRAVIMETRIC METERING, PNEUMATIC CONVEYING AND/OR MIXING OF POURABLE MATERIALS

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 734,650

[22] Filed: Jul. 23, 1991

[30] Foreign Application Priority Data

Jul. 27, 1990 [DE] Fed. Rep. of Germany ....... 4023948

[51] Int. Cl.⁵ .................................................. B01F 5/10
[52] U.S. Cl. .................................... 366/10; 366/136; 366/159
[58] Field of Search ........................................ 366/2-5, 366/10-13, 136, 137, 139, 159; 55/302; 406/63, 31

[56] References Cited

U.S. PATENT DOCUMENTS

| | | | |
|---|---|---|---|
| 3,606,736 | 9/1971 | LeLiaert et al. | 55/302 |
| 3,608,869 | 9/1971 | Woodle | 366/159 |
| 4,083,607 | 4/1978 | Mott | 55/302 |
| 4,222,754 | 9/1980 | Horvat | 55/302 |
| 4,433,986 | 2/1984 | Borst | 55/302 |
| 4,528,848 | 7/1985 | Häfner | 222/55 |
| 4,646,943 | 3/1987 | Häfner | 406/63 |
| 4,661,024 | 4/1987 | Häfner | 406/63 |
| 4,661,131 | 4/1987 | Howeth | 55/302 |
| 4,682,915 | 7/1987 | Häfner | 406/31 |
| 4,738,696 | 4/1988 | Staffeld | 55/302 |
| 4,786,187 | 11/1988 | Nyman et al. | 366/136 |
| 4,907,892 | 3/1990 | Paul | 366/3 |

FOREIGN PATENT DOCUMENTS 0188828 4/1937 Switzerland ..................... 366/11

*Primary Examiner*—Philip R. Coe
*Assistant Examiner*—James F. Hook
*Attorney, Agent, or Firm*—Armstrong, Westerman, Hattori, McLeland & Naughton

[57] ABSTRACT

A system and method for continuous pneumatic gravimetric metering and/or mixing of pourable materials using at least one gravimetric metering apparatus incorporated in a closed loop air conveying path.

19 Claims, 3 Drawing Sheets

SYSTEM AND METHOD FOR CONTINUOUS GRAVIMETRIC METERING, PNEUMATIC CONVEYING AND/OR MIXING OF POURABLE MATERIALS

FIELD OF THE INVENTION

The invention relates to a system and a method for continuous gravimetric metering, pneumatic conveying and/or mixing of pourable materials using metering apparatuses of a type such as e.g. disclosed in U.S. Pat. No. 4,528,848.

BACKGROUND ART

U.S. Pat. No. 4,528,848 discloses such a metering apparatus, where a material stream is conveyed over a measuring path while charging a load measuring device. The conveyor is in the form of a rotor having an essentially vertical axis and pockets moved in a circular orbit over the measuring path. A housing surrounds the rotor and includes a charging aperture and a discharging aperture which are rotationally displaced from each other. A pneumatic conveying system has feed lines, respectively communicating with an air inlet to said housing and the discharging aperture. The pneumatic conveying system is an open system, i.e. pressurized air from a pressurized air source is applied to the apparatus and the air conveying the metered pourable material is directly guided to a device of use of the pourable material which may be a burner of a stove. Though a large through-put is achieved with such an apparatus at relatively high accuracy, temperature changes of the air or variations in humidity thereof may affect the measurement. Furthermore, expelled residual air will contain small quantities of material polluting the atmosphere.

In the book "Dosieren in der Kunststofftechnik", Editor: Verein Dt. Ingenieure, VDI-Ges. Kunststofftechnik, 1st Edition 1978, pages 70/71, systems for continuous gravimetric mixing and pneumatic conveying of a number of components have been disclosed using differential metering scales operating with worm conveyors for supplying gravimetrically metered pourable material through a mixing device to a collecting worm at the outlet of which there is provided a mixing device. The system is extremely complex, specifically if it is necessary to process large quantities. A specific problem is the conveying of the various components to the collecting worm.

German Laid Open Patent Application No. 35 20 657 discloses a multiple system using a single weighing device for three material containers. The containers are emptied by pressurized air one after the other. There is no closed loop air path.

German Laid Open Patent Application No. 26 06 941 discloses a gravimetric metering apparatus. Pourable material is supplied from a storage bin through a cellular sluice into a pneumatic feeding duct for being conveyed through a cyclone separator and a worm into a scale container.

German Patent No. 12 86 958 discloses an apparatus for intermittently conveying of pourable materials using a container filled by applying vacuum and emptied by applying pressure.

German Patent No. 27 55 671 discloses a multiple station conveying system using a closed loop suction air path including a separating filter provided with means for cleaning thereof by applying pressurized air in opposite direction of the suction airstream intermittently.

SUMMARY OF THE INVENTION

It is an object of the present invention to provide a system for continuous gravimetric metering and pneumatic conveying of pourable materials, having improved stability against temperature and humidity influences.

It is a further object of the invention to provide a system for continuous gravimetric metering, pneumatic conveying and/or mixing of pourable materials, having a simple design and being adapted for flexible control of conveyed quantities and mixing ratios of pourable materials.

These and other objects are achieved by a system for continuous pneumatic gravimetric metering of pourable materials comprising a gravimetric metering apparatus including a housing having arranged therein a rotatable rotor having pockets chargeable with pourable material through a charging aperture provided at said housing and dischargeable through a discharging aperture provided at said housing offset in direction of rotation of said rotor in respect of said charging aperture by supplying of pressurized gas; a pourable material charging means arranged at said charging aperture of said housing; pourable material discharging means arranged at said discharging aperture; and a closed loop pneumatic conveying path for said pourable material including separating means for separating said gas from said metered pourable material.

The invention further provides a method for continuous pneumatic gravimetric mixing of at least two pourable materials comprising the steps: providing one gravimetric metering for each pourable material; selectively charging each of said apparatuses according to a desired mixing ratio; pneumatically conveying each of said selectively metered pourable materials into a common collecting and separating means; and adjustably discharging said collecting and separating means.

Further improvements of the system and the method of the invention are characterized in the dependent claims.

DESCRIPTION OF PREFERRED EMBODIMENTS

Figure 2:
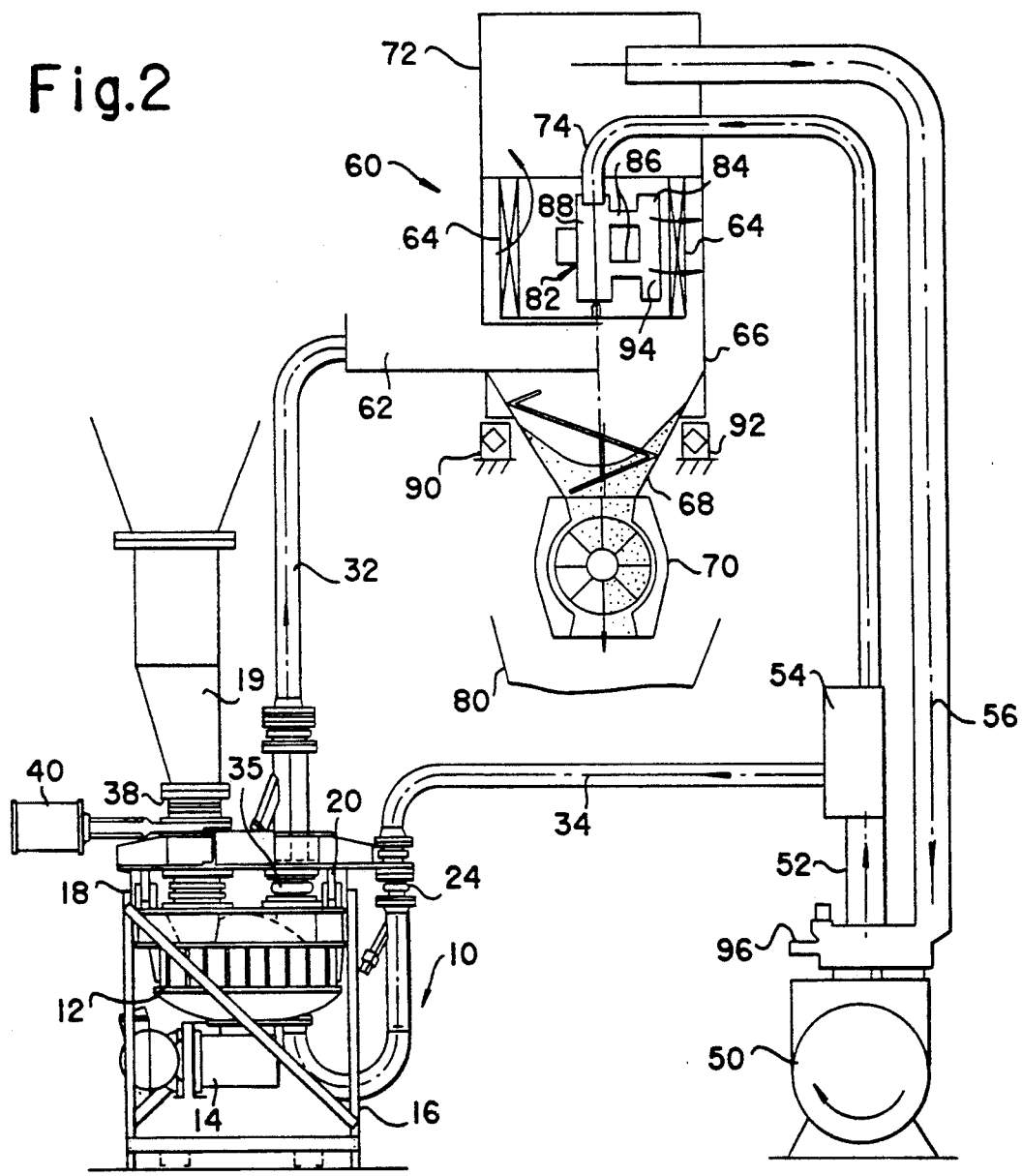
FIG. 2 is a schematic elevational view of a system for continuous pneumatic gravimetric metering of pourable goods of a first embodiment.

First, it is referred to FIG. 2 showing the essential devices of a system of the first embodiment and their connections. It is assumed that pourable material is supplied to a gravimetric metering apparatus 10 directly from a bin (not shown) via a charge member 19.

Conveying of the pourable material is accomplished pneumatically with an airstream being supplied from a blower 50 through a main duct 52 and, if desired, a distributor 54, through a duct 34 to metering apparatus 10.

The metered pourable material is conveyed through a discharging duct 32 into a cyclone separator 60 where the air is separated by a filter 64 and the pourable good is discharged through a cyclone funnel 68 and a cellular wheel sluice 70 (or by gravity) into a receiving bin 80.

The airstream fed into an upper housing portion 72 of cyclone separator 60 is fed back through a feed-back duct 56 to blower 50 resulting in a closed re-circulation. Since some air is inherently lost in metering apparatus 10, a suction valve 96 is arranged in the neighborhood of blower 50 adding so much air that the amount of air in the system is maintained constant.

With the embodiment a gravimetric metering apparatus is used as described in detail in U.S. Pat. No. 4,528,848 the full contents of which is made part of this description by reference. Therefore, these apparatuses are explained here in short only.

Figure 1:
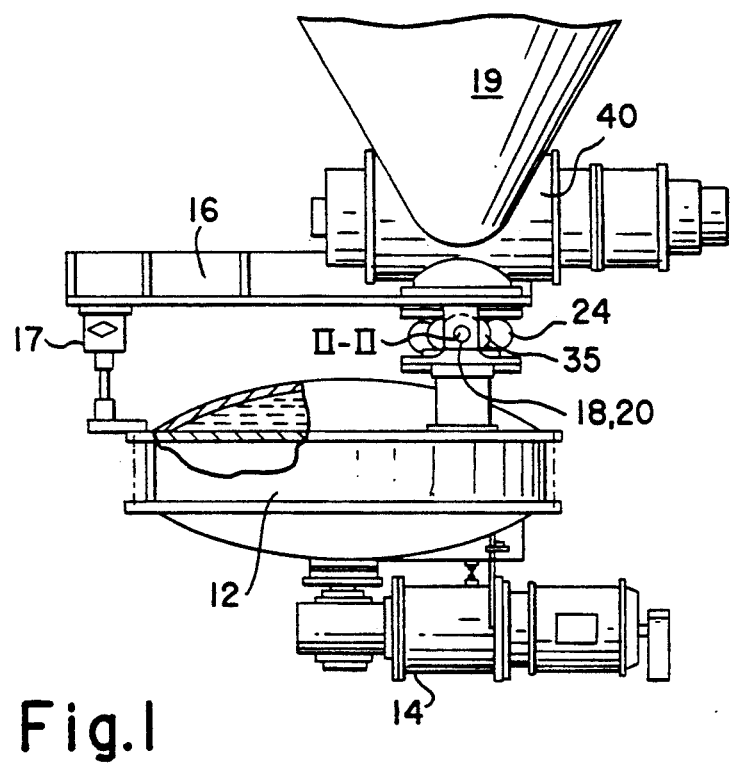
FIG. 1 is a schematic elevational view of a gravimetric metering apparatus as used with the system of the invention.

Referring to FIGS. 1 and 2, such a continuously operating gravimetric metering apparatus comprises a frame 16 by which a rotor 12 is pivotally supported asymmetrically at two pivotal points 18 and 20. As may be seen from FIG. 1, rotor 12 is further suspended at frame 16 via a force measuring device 17, as remotely as possible from pivotal points 18, 20.

As discussed in the above-mentioned U.S. Patent, rotor 12 comprises vertical through-passage pockets annularly arranged and is rotated by a motor 14.

Pourable material charged into the pockets of the rotor through charging funnel 19 and cellular wheel sluice 40 is blown out of the pockets into discharging duct 32 after being conveyed by rotation to a discharging station where the airstream is applied through supply duct 34. Elastic coupling members, as compensators 24 and 35 for connecting rotor 12 to the charging and discharging elements and the air inlet are arranged along an axis extending through pivotal points 18 and 20 (see again U.S. Pat. No. 4,528,848). Thus, measuring results are not affected by moments caused by differences in pressures occurring at the charging and discharging station, respectively.

Force measuring device 17 determines the force exerted to the rotor by the filled-in pourable material. Considering the rotational speed of the rotor, the mass of pourable material fed per time unit may be determined and controlled by changing the rotational speed of the rotor and, if desired, the charging of pourable material through the cellular wheel sluice 40.

As mentioned before, the airstream conveying the metered pourable material will be separated in cyclone separator 60 by a filter 64 (FIG. 2). Means are provided according to the invention for permanently cleaning filter 64, thus ensuring permanent proper operation.

Specifically, there is provided a blowing device 82 in the inner space of filter 64 including a blowing tube 84 arranged essentially vertically adjacent to filter 64 and being provided with nozzles 94 directed toward filter 64. Air is supplied from blower 50 through duct 74 and connecting ducts 86 to a central tube 88 rotatably arranged about a central axis of filter 64.

Blowing device 82 preferably driven by the drive of cyclone separator 60 rotates with a relatively low rotational speed of exemplary ten rotations per minute, moving along the inner peripheral surface of filter 64. The air ejected from nozzles 94 blows pourable material in a line-type stream out of the filter against the direction of the main airstream of the system without interfering with the operation of the system.

The vertical blowing tube 84 may be replaced by a helical nozzle arrangement.

It will be appreciated, that such a permanent filter cleaning contributes to operating the system of the invention permanently with high accuracy.

Figure 3:
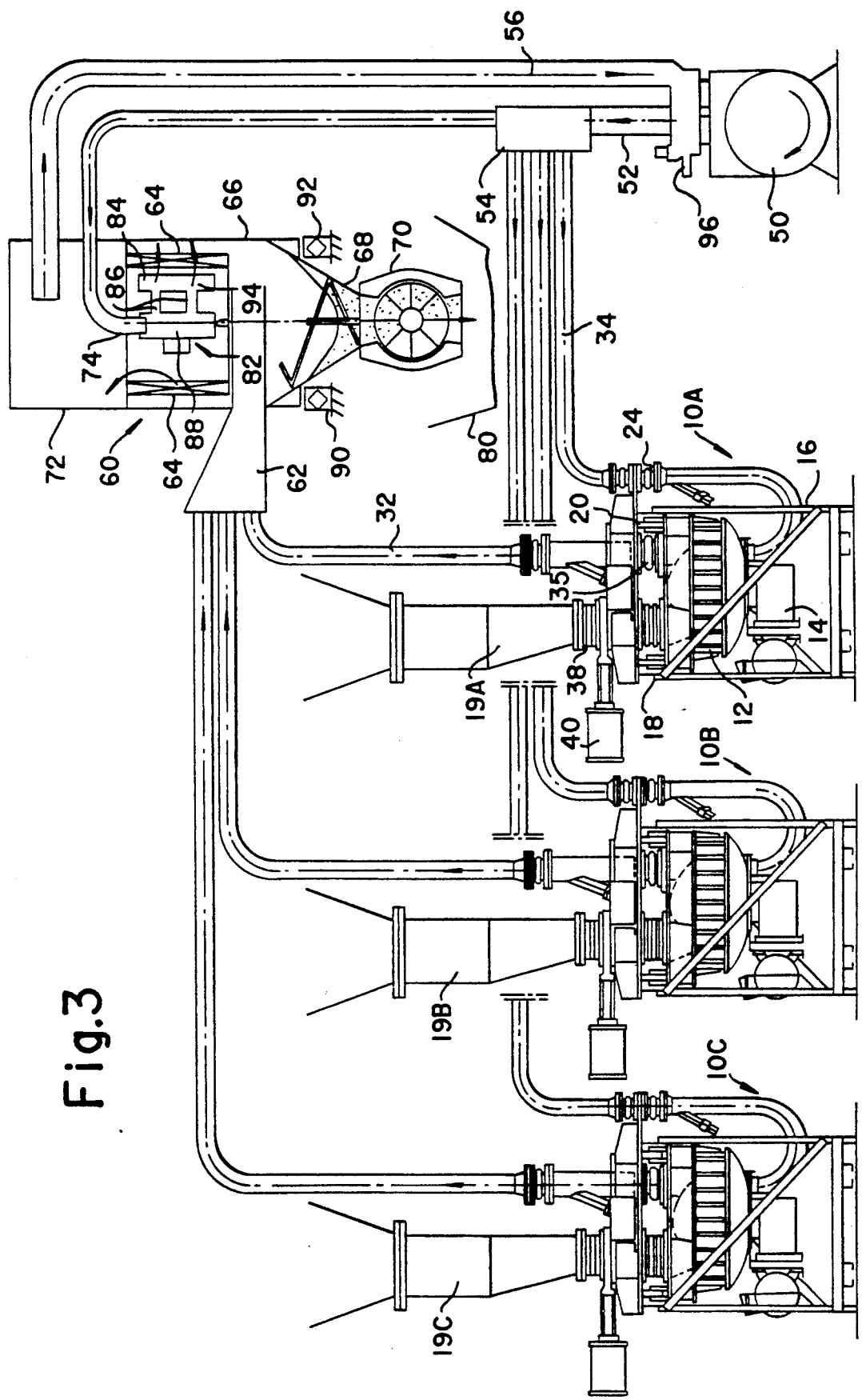
FIG. 3 is a schematic overall view of a second embodiment of a system of the invention for continuous mixing of pourable materials.

Now, it is referred to FIG. 3 illustrating the essential devices and connections of the system of the second embodiment applied for a mixing system. It is assumed that three different materials are to be mixed. This means using three gravimetric metering apparatuses 10A, 10B, 10C having supplied thereto the corresponding material directly from bins (not shown) through charging devices 19A, 19B, and 19C, respectively.

Conveying of the pourable material is again pneumatically, with an airstream from blower 50 being fed through main duct 52 to distributor 54 connected via corresponding ducts 34 to metering apparatuses 10A, 10B, and 10C, respectively.

Each metered material is conveyed through discharging ducts 32 and a combining device 62 into cyclone separator 60 separating the air by filter 64 and directing the combined pourable materials through cyclone funnel 68 and cellular wheel sluice 70 into receiving bin 80 or directly to an apparatus of use.

As indicated above, mass through-put through the metering apparatuses 10A, 10B, and 10C may be adjusted within wide ranges and controlled to values desired. Consequently, the same three metering devices may be used even with quite different mixing ratios. Alternatively, for such situations gravimetric metering apparatuses having quite different mass through-put may be used.

A further possibility to control mass through-put is provided by distributor 54; in contrast to a uniform distribution of the airstream to ducts 34 control valves therefor permit variation of airstream quantities. Furthermore, the overall airstream caused by blower 50 may be varied in order to ensure a continuous conveying and mixing of pourable goods depending upon need.

It should be noted, that cyclone separator 60 may be supported by preferably three force measuring cells, only two of which, i.e. 90, 92 are shown in the drawing. This enables determining continously the mass of pourable material currently present therein and to adjust either the rotational speed of the cellular wheel sluice 70 or the overall airstream quantity of blower 50.

The foregoing explanations indicate that with the system according to the invention quite different mixing and conveying situations may be managed with a relatively high accuracy and a continuous operation.

Though with the second preferred embodiment of the invention a system using a closed airstream circulation is shown, such a system may be operated as an open system as well, specifically with a pressure-operated system without feed-back duct 56 or with slight modifications as a suction system without supply ducts 34, with the advantages of the metering devices according to U.S. Pat. No. 4,528,848 still applicable.

For adjusting the corresponding mixing ratios and conveyed material quantities per time unit and for controlling the corresponding parameters in dependence on set desired values, a computer-controlled central metering control system may be used, as exemplary explained in the book "Handbuch des Wägens", Editor: Manfred Kochsieck, 2nd Edition 1989, pages 477/478, with appropriate adaptations for the system of the invention.

Eventually it should be noted, that with the preferred embodiment gravimetric metering apparatuses according to the above-mentioned U.S. Patent are used with advantage. However, these metering apparatuses may be replaced by corresponding appropriate metering devices, as far as they are pneumatically operated. Furthermore, with a closed system as a conveying medium any other gas instead of air may be used, in case one or several of the materials are aggressive or tend to react chemically or physically.

I claim:

1. A system for continuous pneumatic gravimetric metering of pourable materials comprising:
a gravimetric metering apparatus including a housing having arranged therein a rotatable rotor having pockets, a charging aperture provided in said housing for charging material into the pockets, a discharging aperture provided in said housing offset in direction of rotation of said rotor in respect of said charging aperture for discharging material from the pockets, and means for supplying a pressurized gas to discharge material from said pockets and convey said material; a pourable material charging means arranged at said charging aperture of said housing; pourable material discharging means arranged at said discharging aperture; a closed loop pneumatic conveying path for said pressurized gas including separating means for separating said gas from said metered and conveyed pourable material, said separating means further comprises a metered pourable material collecting means arranged at the output said of said separating means, and control means settable according to a desired conveyed mass of pourable material per time unit and responsive to a metered quantity for controlling mass through-put through said system.

2. The system of claim 1, wherein said pneumatic conveying path is of a suction-type.

3. The system of claim 2, wherein said pneumatic conveying path is of a pressure-type.

4. The system of claim 1, wherein said metered pourable material collecting means is supported on means for determining a mass of metered pourable material contained therein.

5. The system of claim 4, wherein said collecting means are provided with controllable discharging means.

6. The system of claim 5, wherein said controllable discharging means is a cellular wheel sluice means of controllable rotational speed.

7. The system of claim 1, wherein said separating means includes filter means and a gas-tight metered pourable material collecting and discharging means.

8. The system of claim 7, wherein said collecting means are provided with controllable discharging means.

9. The system of claim 7, wherein said filter means comprises a tube-type filter having arranged in an interior space thereof a rotatable blowing means for cleaning of said filter.

10. The system of claim 1, wherein said mass throughput is adjustable by varying a supplied quantity of gas per time unit.

11. The system of claim 1, wherein said mass throughput is adjustable by varying a rotational speed of said rotor.

12. A system for continuous pneumatic gravimetric mixing of at least two pourable materials comprising:
for each pourable material, a gravimetric metering apparatus including a housing having arranged therein a rotatable rotor having pockets, a charging aperture provided in said housing for charging material into the pockets, a discharging aperture provided in said housing offset in direction of rotation of said rotor with respect of said charging aperture for discharging material from the pockets, and means for supplying a pressurized gas to discharge material from said pockets and convey said material;
a pourable material charging means for each metering apparatus;
a separate gas supply duct and a separate discharging duct for each metering apparatus;
a pneumatic conveying path including a common gas conveying means communicating with each discharging duct,
a common metered pourable material separating means connected to said common gas conveying means for separating gas from said pressurized gas conveying said metered pourable materials, and
control means adapted to be set to desired values of a mixing ratio, desired quantities of conveyed pourable material per time unit, and for receiving current values thereof for controlling pourable material through-puts of the individual metering apparatuses.

13. The system of claim 12, wherein said common separating means includes a common metered pourable materials collecting means.

14. The system of claim 13, wherein said common metered pourable materials collecting means are provided with controllable discharging means.

15. The system of claim 12, wherein said conveying path is a closed loop path from said discharging ducts of said gravimetric metering apparatus to said separating means and thence to said gas supply ducts of said gravimetric metering apparatus and which include a common gas feed-back duct.

16. The system of claim 14, further comprising gas distribution means arranged downstream of said gas conveying means and having outputs connected to said gas supply ducts.

17. The system of claim 16, further comprising setting means arranged with said distributing means for selectively setting said gas through-put for each of said metering apparatuses.

18. The system of claim 12, wherein said throughputs are adjusted by varying said gas quantities supplied per time unit to said metering apparatuses.

19. The system of claim 12, wherein said control unit controls said gas conveying means, rotational speeds of said metering apparatuses and/or said discharging means.

* * * * *